United States Patent [19]

Herrmann, Jr. et al.

[11] Patent Number: 4,845,708
[45] Date of Patent: Jul. 4, 1989

[54] VEHICLE MULTIPLEX SYSTEM

[75] Inventors: Henry O. Herrmann, Jr., Elizabethtown; Lee W. Steely, Reinholds, both of Pa.

[73] Assignee: AMP Incorporated, Harrisburg, Pa.

[21] Appl. No.: 107,623

[22] Filed: Oct. 9, 1987

[51] Int. Cl.$^4$ ............................................. H04J 3/02
[52] U.S. Cl. .................................... 370/85; 307/10.1
[58] Field of Search ....................... 370/85, 110.1, 94; 340/825.5, 52 F; 307/10 R

[56] References Cited

U.S. PATENT DOCUMENTS

| | | | |
|---|---|---|---|
| 3,651,454 | 3/1972 | Venema et al. | 340/52 F |
| 3,864,578 | 2/1975 | Lackey | 307/10 R |
| 4,028,738 | 6/1977 | Rouvre et al. | 361/403 |
| 4,122,357 | 10/1978 | Sumida | 307/10 R |
| 4,156,151 | 5/1979 | Borroni | 307/10 R |
| 4,176,250 | 11/1979 | Berglind | 179/1 VE |
| 4,232,231 | 11/1980 | Reed | 307/10 R |
| 4,463,341 | 7/1984 | Iwasaki | 340/310 A |
| 4,538,262 | 8/1985 | Sinniger et al. | 370/85 |
| 4,551,632 | 11/1985 | Jourdan et al. | 307/9 |
| 4,554,461 | 11/1985 | Oho et al. | 307/40 |
| 4,555,638 | 11/1985 | Lobe | 307/10 R |
| 4,584,487 | 4/1986 | Hesse et al. | 307/10 R |
| 4,594,571 | 6/1986 | Neuhaus et al. | 340/52 F |

FOREIGN PATENT DOCUMENTS

| | | |
|---|---|---|
| 0093654 | 11/1983 | European Pat. Off. . |
| 0143650 | 6/1985 | European Pat. Off. . |
| 0082300 | 1/1986 | European Pat. Off. . |
| 2184193 | 12/1973 | France . |
| 61-18824 | 6/1986 | Japan . |
| 2058418 | 4/1981 | United Kingdom . |

OTHER PUBLICATIONS

Ingenieurs De L'Automobile, No. 2, Feb./Mar. 1980, pp. 48-51, Paris, FR; Guagliumi et al.: "Systeme electrique multiplex", p. 48, introduction; Fig.

Primary Examiner—Robert L. Griffin
Assistant Examiner—Frank M. Scutch, III
Attorney, Agent, or Firm—Bruce J. Wolstoncroft

[57] ABSTRACT

A vehicle multiplex system includes a multiplex controller mounted in a fuse block of the vehicle. Both power buses and control buses radiate from the fuse block, and the control buses interconnect the controller with respective input and output units distributed about the vehicle. Preferably, the controller selects one of the control buses as an active bus at any given time and isolates the remaining control buses both from the active control bus and from the controller. In this way, system reliability is improved, and electromagnetic interference is reduced. By positioning the multiplex controller in the fuse block, wiring requirements for the multiplex system are simplified and the multiplex system is more readily integrated into the electrical system of the vehicle.

8 Claims, 9 Drawing Sheets

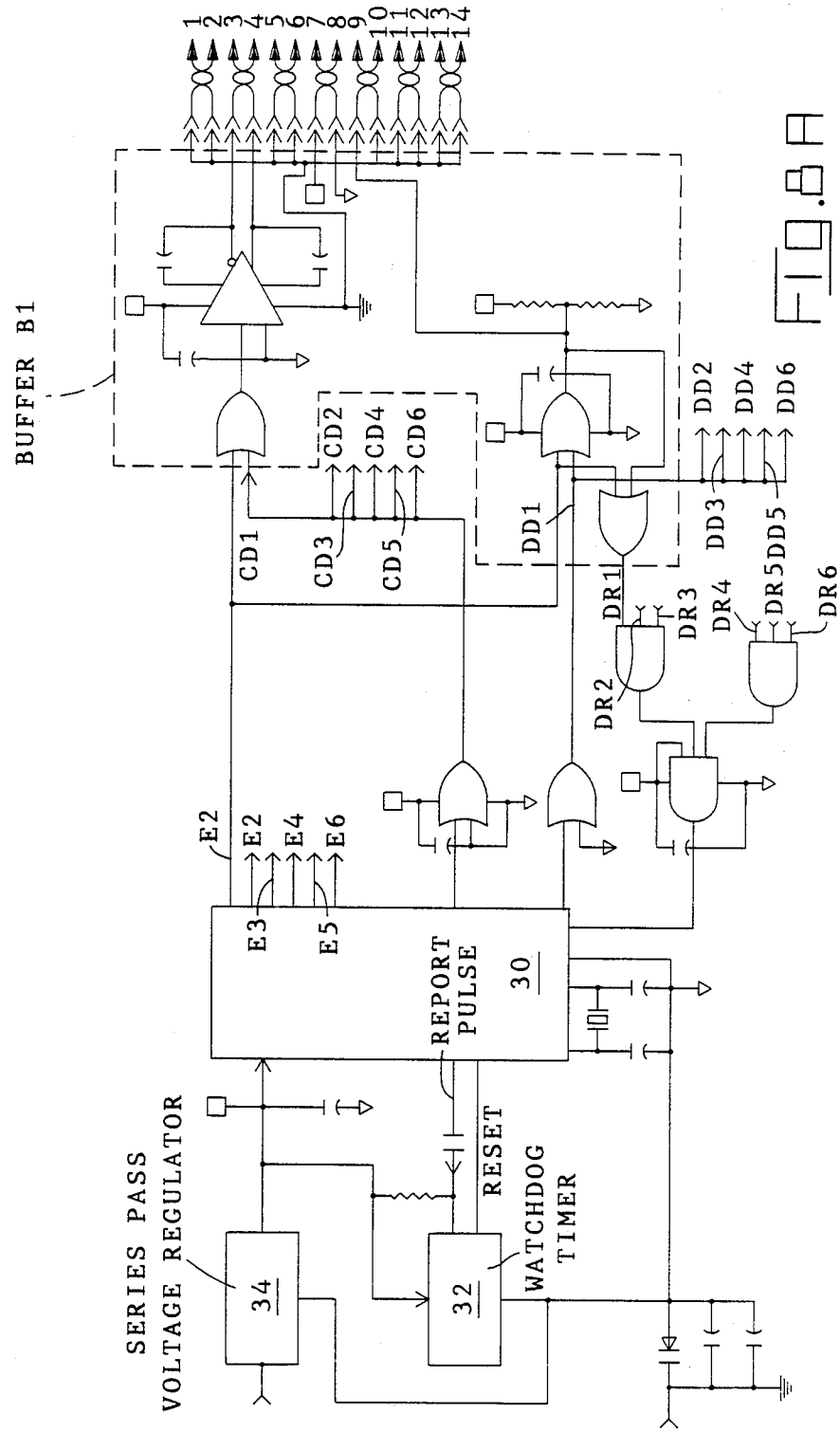

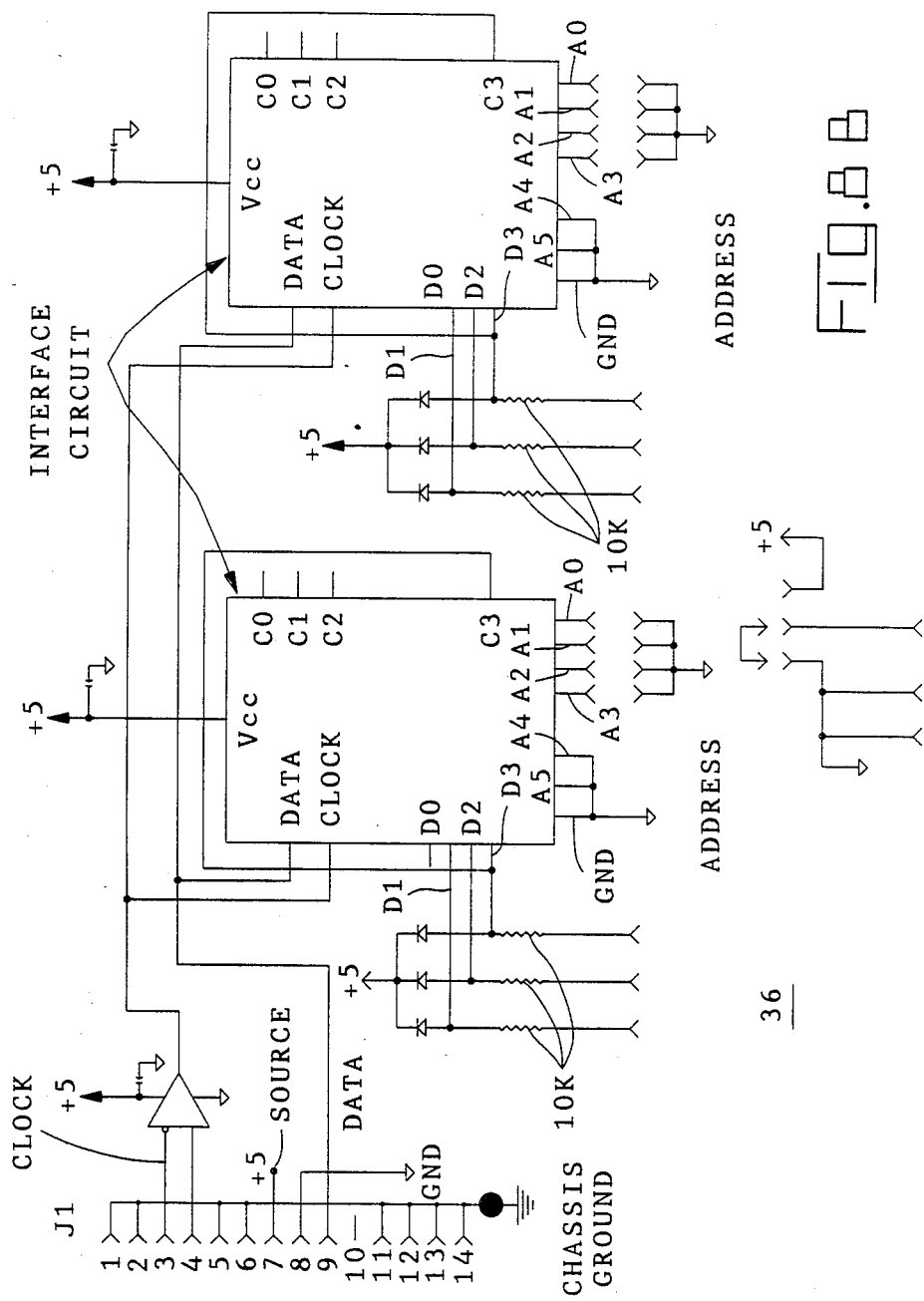

VEHICLE MULTIPLEX SYSTEM

BACKGROUND OF THE INVENTION

This invention relates to an improved multiplex system which is coordinated with the power bus system and the fuse block of a vehicle in order to reduce the cost and improve the performance of the multiplex system.

Conventionally, vehicles such as automobiles include an electrical power distribution system which includes a fuse block from which a number of power buses radiate. Fuses are provided in the fuse block to provide overload protection for individual ones of the power buses. The fuse block is conventionally mounted either near the instrument panel or in the engine compartment of the vehicle. Lobe U.S. Pat. No. 4,555,638 describes one example of such a prior art fuse block.

There is an increasing interest in utilizing multiplex systems to reduce the cost and number of cables required to transmit control signals between switches distributed around the vehicle and the loads controlled by the switches. The U.S. patents listed below describe several approaches to such multiplex systems.

| U.S. Pat. No. | Inventor(s) |
|---|---|
| 3,651,454 | Venema et al. |
| 4,156,151 | Borroni |
| 4,176,250 | Berglind |
| 4,232,231 | Reed |
| 4,463,341 | Iwasaki |
| 4,538,262 | Sinniger et al. |
| 4,554,461 | Oho et al. |
| 4,584,487 | Hesse et al. |
| 4,594,571 | Neuhaus et al. |

Berglind U.S. Pat. No. 4,176,250 describes a time division multiplex system for an automobile which utilizes a transmitter module located in the left front door of the automobile. This transmitter module transmits information to receiver modules which are interconnected by means of a data line and are located in the passenger doors and beneath the front seat of the automobile. The remaining patents listed above, though they relate to multiplex systems for vehicles, do not discuss the location of the controller. All of the multiplex systems of these patents are independent of and not coordinated in the manner described below with the power distribution system of the vehicle. As pointed out in detail below, for these reasons these multiplex systems do not take advantage of important economies and improvements in reliability that can be achieved by properly coordinating the power distribution system and the multiplex system of the vehicle.

SUMMARY OF THE INVENTION

The present invention relates to a multiplex system for a vehicle of the type comprising a source of power; a plurality of loads; a fuse block; means for transmitting electrical current from the source of electrical power to the fuse block; a plurality of power buses radiating from the fuse block, each connected to at least one of the loads to transmit electrical current from the fuse block to the respective loads; and fuse means disposed in the fuse block for providing fusible connections between the transmitting means and the power buses.

According to this invention, a vehicle of the type described above is provided with a plurality of control buses which radiate from the fuse block; means for applying a plurality of multiplexed control signals to the control buses at the fuse block; a plurality of remote stations coupled to the control buses, at least some of said remote stations comprising means for monitoring the respective control bus and for generating demultiplexed control signals in response to selected ones of the multiplexed control signals; and means, responsive to the demultiplexed control signals, for switching electrical current from the power buses to the respective loads.

As pointed out in detail below, the present invention achieves important advantages by arranging the control buses of the multiplex system to radiate from the fuse block. Because the power buses in many cases travel to the same general vicinity as the control buses, this approach simplifies vehicle wiring requirements. Furthermore, in the preferred embodiment described below the individual control buses are isolated from one another such that the control means interacts with only one of the control buses at a time. This approach provides a highly reliable system in which a failure in one control bus often does not disable the entire multiplex system. Furthermore, in this approach not all of the control buses are driven at any given time. For this reason the total length of control buses radiating electromagnetic interference, and therefore the level of electromagnetic interference generated by the control buses, are reduced.

The invention itself, together with further objects and attendant advantages, will best be understood by reference to the following detailed description, taken in conjunction with the accompanying drawings.

BRIEF DESCRIPTION OF THE DRAWINGS

FIGS. 8a–8c are detailed schematic diagrams of parts of the multiplex system of FIG. 1.

DETAILED DESCRIPTION OF THE PRESENTLY PREFERRED EMBODIMENTS

Figure 1:
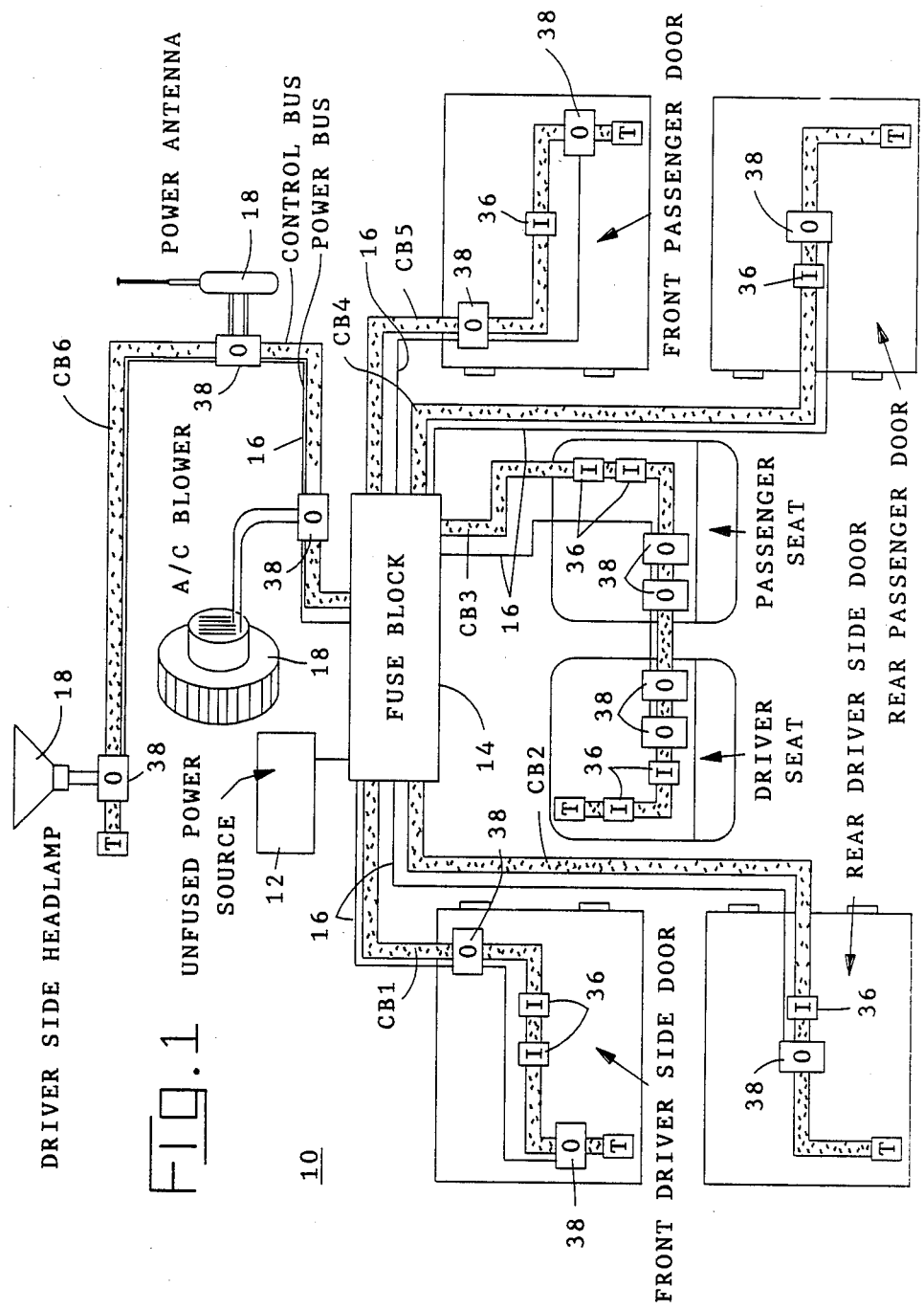
FIG. 1 is a block diagram of a vehicle multiplex system which incorporates a presently preferred embodiment of this invention.
Figure 2:
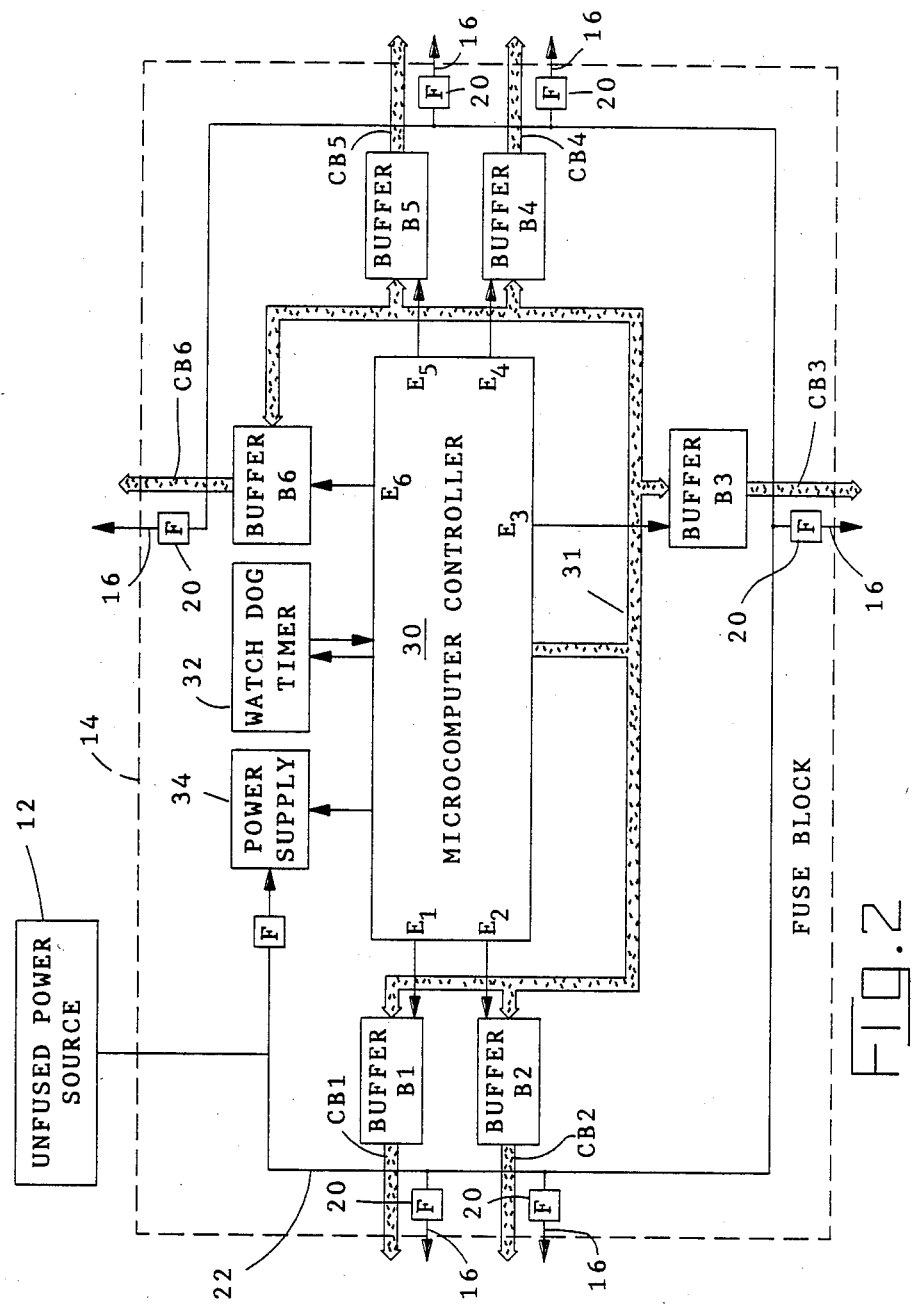
FIG. 2 is a more detailed block diagram of the fuse block of FIG. 1.

Turning now to the drawings, FIG. 1 shows a block diagram of a vehicle 10 which incorporates a presently preferred embodiment of this invention. FIG. 2 shows a more detailed block diagram of the fuse block of FIG. 1. As shown in these drawings, the vehicle 10 includes an unfused power source 12, which may be, for example, a conventional rechargeable battery and alternator system. The unfused power source 12 supplies electrical current to a fuse block 14. The fuse block 14 includes a number of fuses 20, and each of the fuses 20 is interposed between a respective power bus 16 and a conductor 22 which interconnects the fuses 20 with the unfused power source 12. In FIG. 1, six separate power buses 16 are shown, all radiating from the fuse block 14 to a respective set of electrical loads 18. For example, in FIG. 1, the uppermost power bus 16 supplies electrical current to three loads 18: an air conditioner blower, a power antenna, and a driver's side head lamp. The remaining power buses 16 supply electrical current to motors (not shown) which drive the power seats, power windows, and electrically adjustable mirrors.

The aspects of the vehicle 10 described above have been in common use for some time in conventional vehicles. These aspects of the vehicle 10 have been described in order to define the environment of the present invention, and in order to clarify the manner in which the multiplex system of this invention cooperates with the fuse block 14 and the power buses 16.

According to this invention, the fuse block 14 includes a controller 30, which is preferably implemented as a programmed microcomputer. This microcomputer is powered by a power supply 34, which is electrically coupled to the power source 12. The controller 30 sends multiplexed control signals and receives multiplexed data signals via a bus 31 which is interconnected in parallel with six buffers B1-B6. Each of the buffers B1-B6 is in turn connected to a respective control bus CB1-CB6. As shown in FIG. 1, the control buses CB1-CB6 radiate outwardly from the fuse block 14 and in large part are routed in parallel with the respective power buses 16. As is conventional, the controller 30 periodically transmits pulses to a watch dog timer 32, and the watch dog timer 32 is constructed to respond to the absence of such periodic pulses, as for example by resetting the controller 30.

The controller 30 operates as a means for applying multiplexed control signals to the control buses CB1-CB6. The present invention can readily be adapted for use with controllers 30 utilizing any one of a variety of multiplexing techniques. For example, time division multiplexing is one approach well suited for use with this invention. However, this invention is not limited to use with any particular multiplexing technique or any particular type of controller 30.

The buffers B1-B6 operate as digital switches which, when closed, interconnect the respective control buses CB1-CB6 with the bus 31, and, when opened, isolate the bus 31 and the controller 30 from the respective control buses CB1-CB6. The state of each of the buffers B1-B6 is controlled by the controller 30 via output signals supplied via terminals E1-E6. Preferably, the controller 30 is programmed so as to interconnect only a subset of the control buses CB1-CB6 (most preferably only a single one of the control buses CB1-CB6) to the bus 31 at any given time. For example, the microcomputer can sequentially control the buffers B1-B6 such that only one of the control buses CB1-CB6 is active at any given time. The microcomputer is preferably programmed to control the buffers B1-B6 so as to interconnect the bus 31 only with the control bus CB1 while isolating the bus 31 from all of the remaining buses CB2-CB6 for a first time interval, and then to connect only the control bus CB2 with the bus 31, and so forth. As pointed our below, this approach provides important advantages in terms of improved reliability and decreased electromagnetic interference generated by the multiplex system.

The bus 31 and the buffers B1-B6 in this embodiment operate as a junction means for a sequentially interconnecting the controller 30 with individual ones of the control buses such that only selected ones of the control buses are active at any given time, and the remaining control buses are isolated from the bus 31 and the controller 30. In this way, selected sets of the control buses CB1-CB6 are sequentially isolated from the controller 30.

Figure 3:
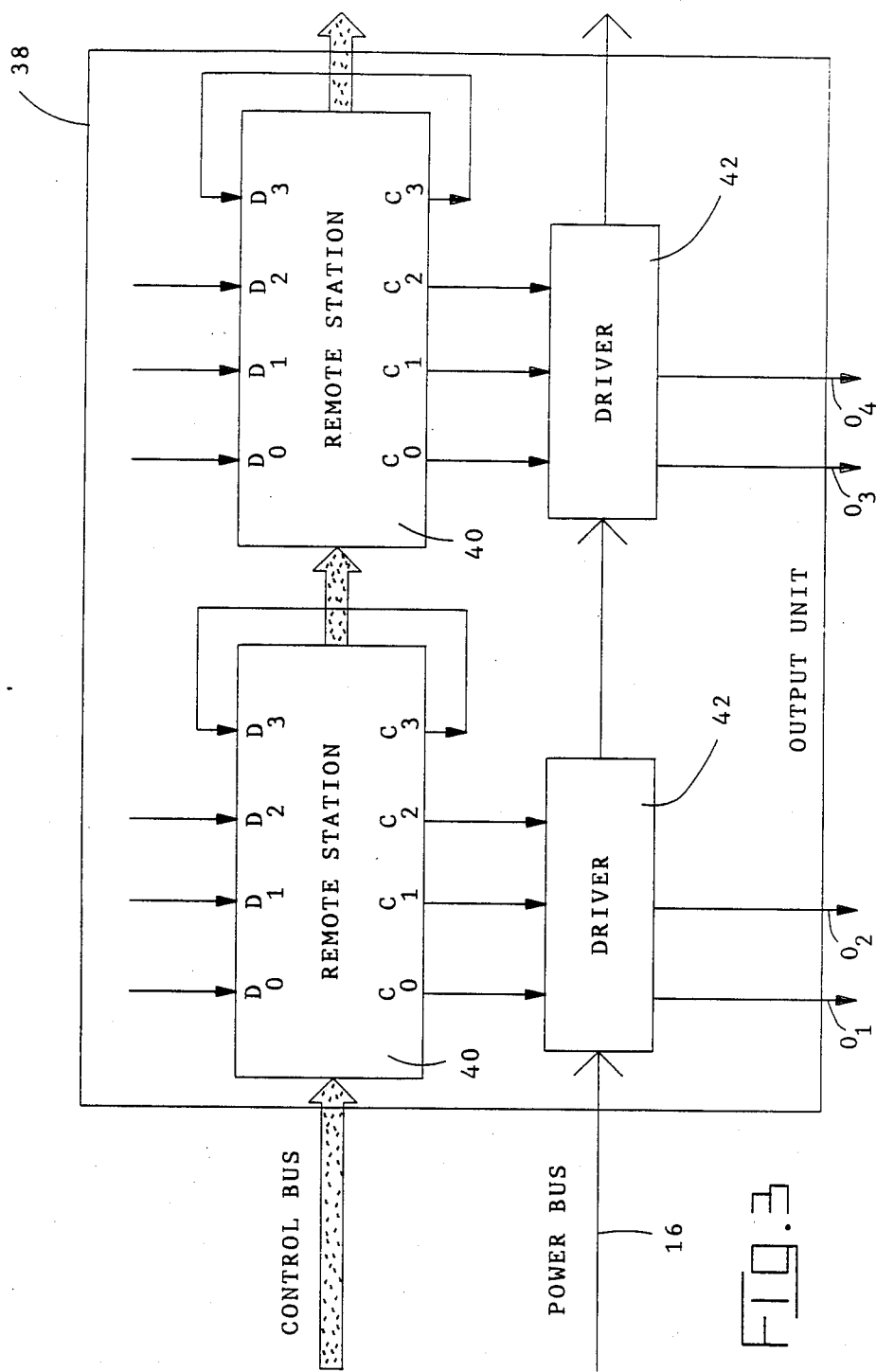
FIG. 3 is a more detailed block diagram of one of the output units of FIG. 1.
Figure 4:
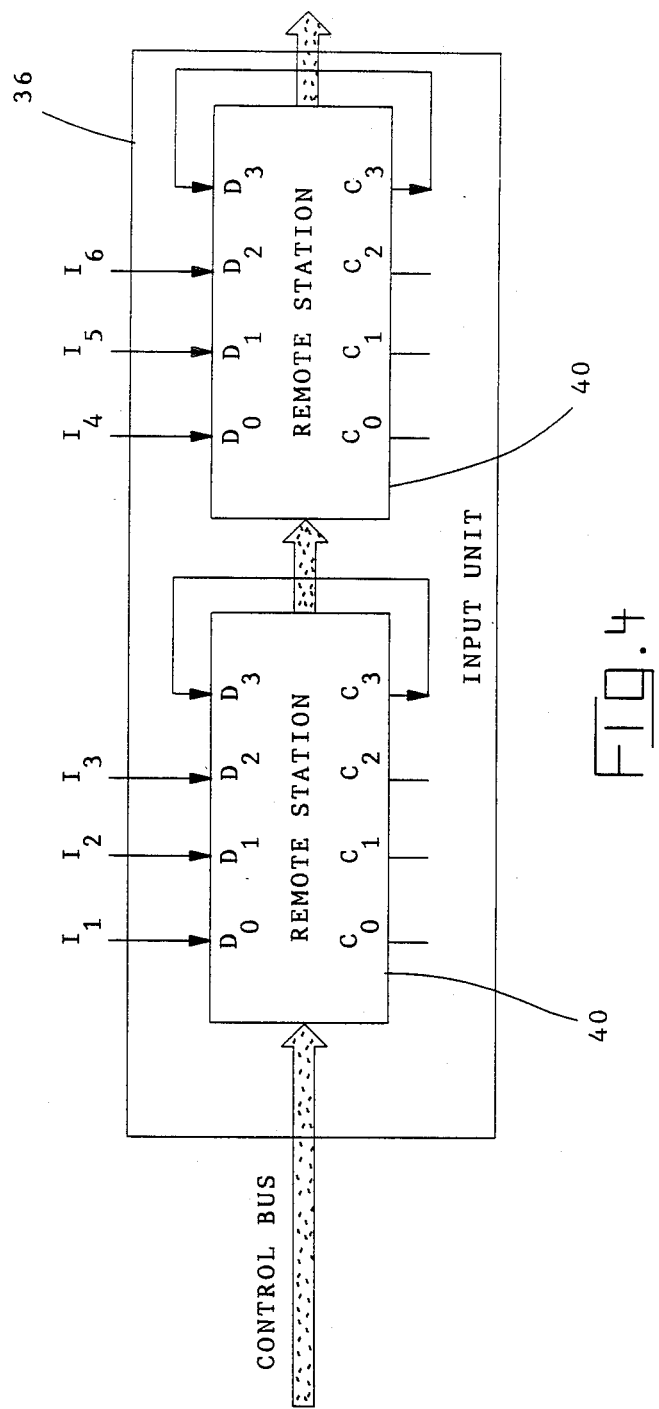
FIG. 4 is a more detailed block diagram of one of the input units of FIG. 1.

As shown in FIG. 1, a plurality of input units 36 and output units 38 are electrically interconnected with the control buses CB1-CB6. FIGS. 3 and 4 provide more detailed block diagrams of the output units 38 and the input units 36. As is shown in FIG. 3, each of the output units 38 includes a pair of remote stations 40, each of which is connected to the respective control bus. The presently preferred circuitry for the remote stations 40 is described in detail in the following patent documents: U.S. Pat. No. 4,508,399 (*Fortuna and Dowling*) and U.S. patent application Ser. No. 921,185 (Chang), both assigned to the assignee of this invention. These applications are hereby incorporated by reference for their detailed disclosure of the structure of the remote stations 40. For the purpose of this specification, it is sufficient to describe the general operation of the remote station 40.

Figure 5:
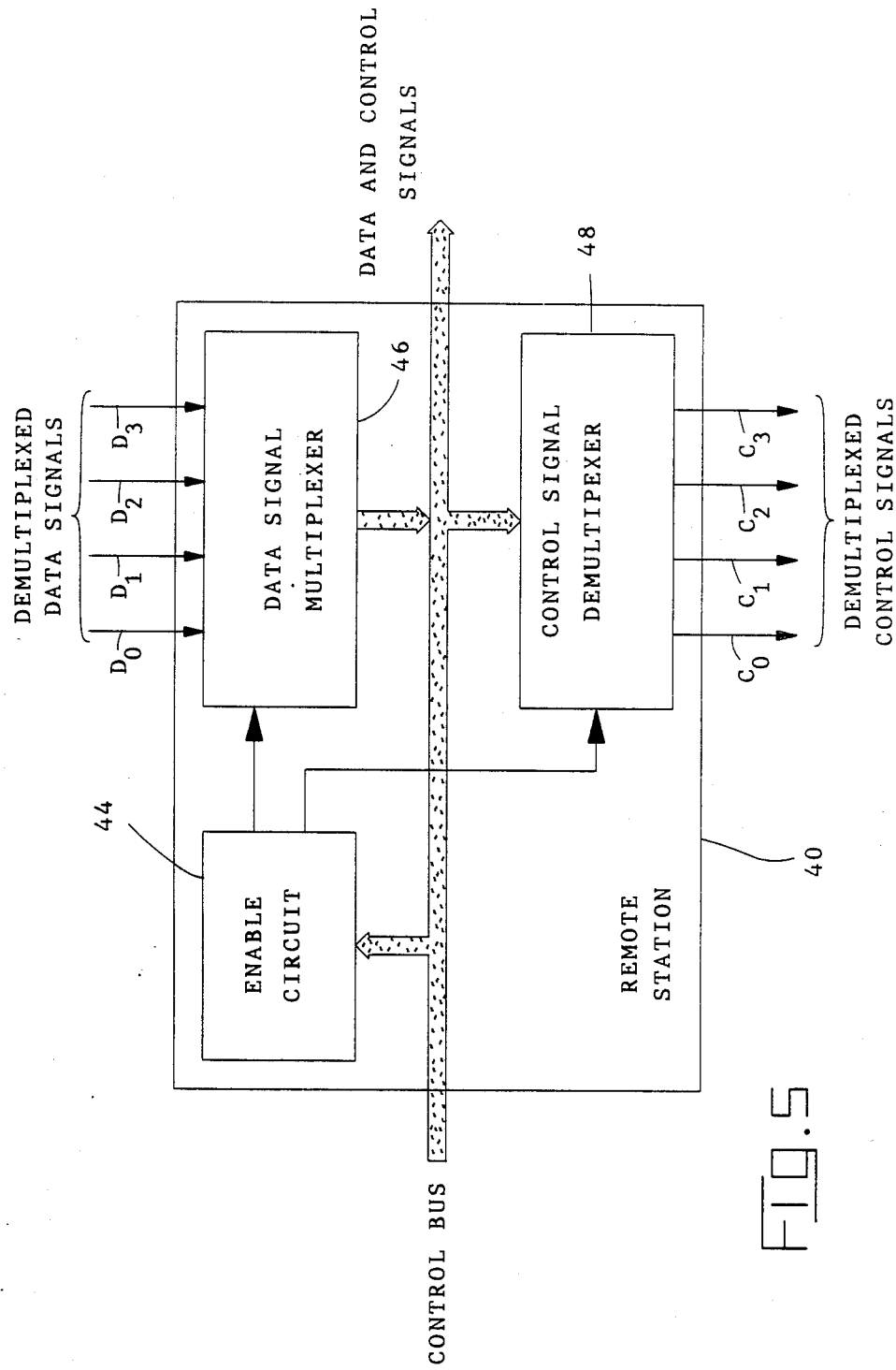
FIG. 5 is a more detailed block diagram of one of the remote stations of FIGS. 3 and 4.

FIG. 5 shows a more detailed block diagram of one of the remote stations 40, which includes an enable circuit 44, a data signal multiplexer 46, and a control signal demultiplexer 48. In this embodiment, the control bus includes a clock conductor and a data conductor (not shown). The clock conductor carries a clock signal, a repeating square wave of 50 percent duty cycle which is used to synchronize operation of all of the remote stations 40 and to enable operation of respective ones of the remote stations 40 at the appropriate times. The controller 30 generates the clock signals in sets which are separated by relatively long periods of inactivity on the clock conductor. The enable circuit 44 of the remote station 40 counts cycles of the clock signal within each set and compares the count with an address count which is unique to each remote station on any one of the control buses CB1-CB6. When the count of clock cycles on the clock conductor equals the stored address count for a given remote station 40, the enable circuit 44 enables the data signal multiplexer 46 and the control signal demultiplexer 48 for respective ones of the next eight consecutive clock cycles.

The data signal multiplexer 46 has four digital inputs D0-D3, each of which carries a respective demultiplexed data signal. At the respective clock cycle, the data signal multiplexer 46 imposes a voltage on the data conductor which is indicative of the state of the demultiplexed data signal on the respective input D0-D3. Similarly, the control signal demultiplexer 48 includes four digital signal outputs C0-C3, and the control signal demultiplexer 48 is controlled by the enable circuit 44 so as to latch and hold the binary state of the data conductor during respective clock cycles, and to apply these latched states to the respective outputs C0-C3 as demultiplexed control signals.

By reading the state of the data conductor at appropriate time intervals synchronized with the clock cycles, the controller 30 can read the state of the demultiplexed data signals on data inputs D0-D3 of the remote stations 40. Similarly, by applying a suitable voltage to the data conductor at the appropriate time, the controller 30 can transmit a multiplexed control signal which is demultiplexed by the control signal demultiplexer 48 and latched and held on the respective demultiplexed control signal output C0-C3. In this way, demultiplexed data signals applied to the remote station 40 are multiplexed and transmitted to the controller 30, and multiplexed control signals generated by the controller 30 are transmitted to and latched by the remote stations 40.

Returning to FIG. 3, each of the output units includes two remote stations 40. In this embodiment, the data inputs D0-D3 are not used in the output units 38. The control output C3 is interconnected with the data input D3 within each remote station 40. This allows the controller 30 to set any selected one of the control outputs C3 and then to monitor the data input D3 of the respective remote station 40 to verify both integrity of the control bus and proper operation of the remote station 40.

Figure 7:
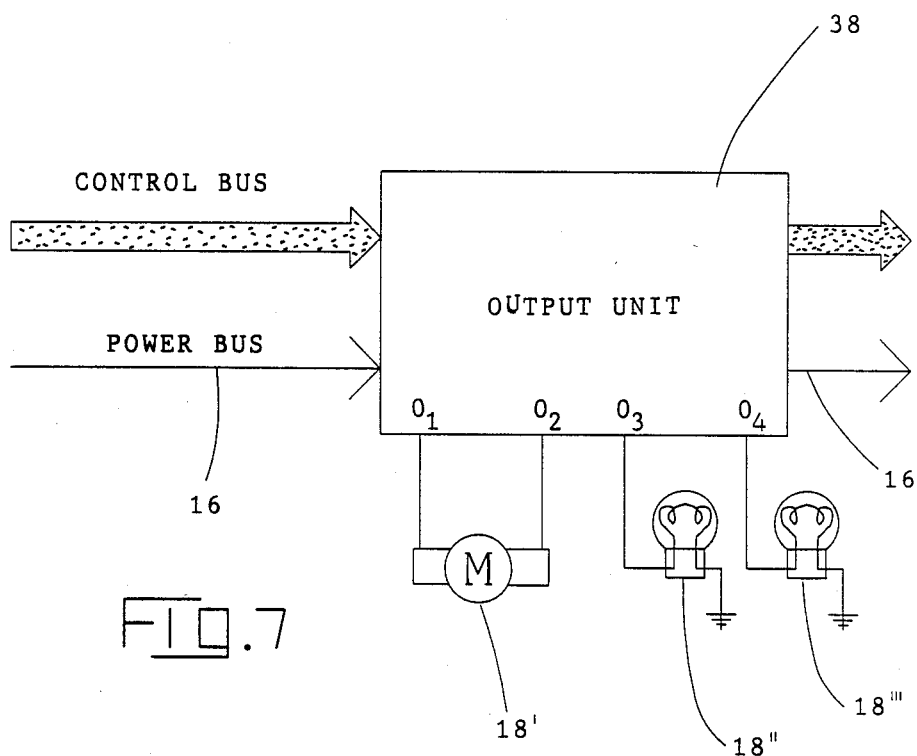
FIG. 7 is a block diagram showing the manner in which one of the output units of FIG. 3 can be connected to a number of electrical loads.

The three remaining control outputs C0-C2 are applied to a driver 42 which is connected with the respective power bus 16. In this embodiment, each of the drivers 42 is a DC bridge driver such as that described in detail in co-pending U.S. patent application Ser. No. 07/064,917, assigned to the assignee of the present invention. The drivers 42 generate demultiplexed load outputs 01-04 which are power outputs that can be applied directly to a load being driven. FIG. 7 shows one illustrative embodiment in which the power outputs 01, 02 are applied to a reversible motor 18' so as to drive the motor 18' in either a forward or reverse direction. Such motors may be used for example in electric window lifts, power seats, electrically adjustable mirrors, power antennas, and the like. Other typical loads are lamps 18", as shown connected to load outputs 03 and 04 in FIG. 7.

In summary, each of the output units 38 receives multiplexed control signals from the controller 30 via the respective control bus, demultiplexes, latches, and holds the respective control signals, and then uses the resulting control outputs to switch power from the respective power bus to the controlled loads.

Figure 6:
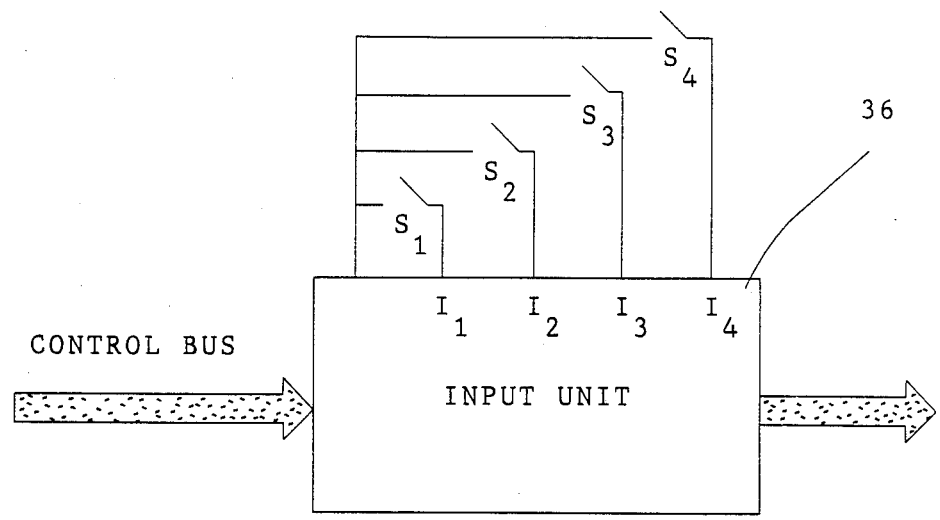
FIG. 6 is a block diagram illustrating the manner in which one of the input units of FIG. 4 can be connected to a plurality of switches.

FIG. 4 shows a block diagram of one of the input units 36. As shown in FIG. 4, each of the input units 36 includes two remote stations 40. As before, the control outputs C3 are directly connected to the data inputs D3 in order to allow the controller 30 to monitor the operation of the input units 36. The remaining control outputs C0-C2 are unused, and the remaining data inputs D0-D2 receive demultiplexed data signals on demultiplexed data inputs I1-I6. FIG. 6 shows one illustrative application of one of the input units 36, in which four of the demultiplexed data inputs I1-I4 are electrically connected with respective switches S1-S4. By closing selected ones of the switches S1-S4, binary signals in either the logic low or the I1-I4 for multiplexing and transmission via the control bus to the controller 30. By way of example, switches S1-S4 can be window lift control switches, or the like. In use, the operator closes selected switches in order to transmit multiplexed data signals from the respective input unit 36 to the controller 30 in the fuse block 14. The controller 30 then generates appropriate multiplexed control signals which are transmitted via the respective control bus to the appropriate output station 38 in order to control electrical current to the selected load.

Figure 8C:
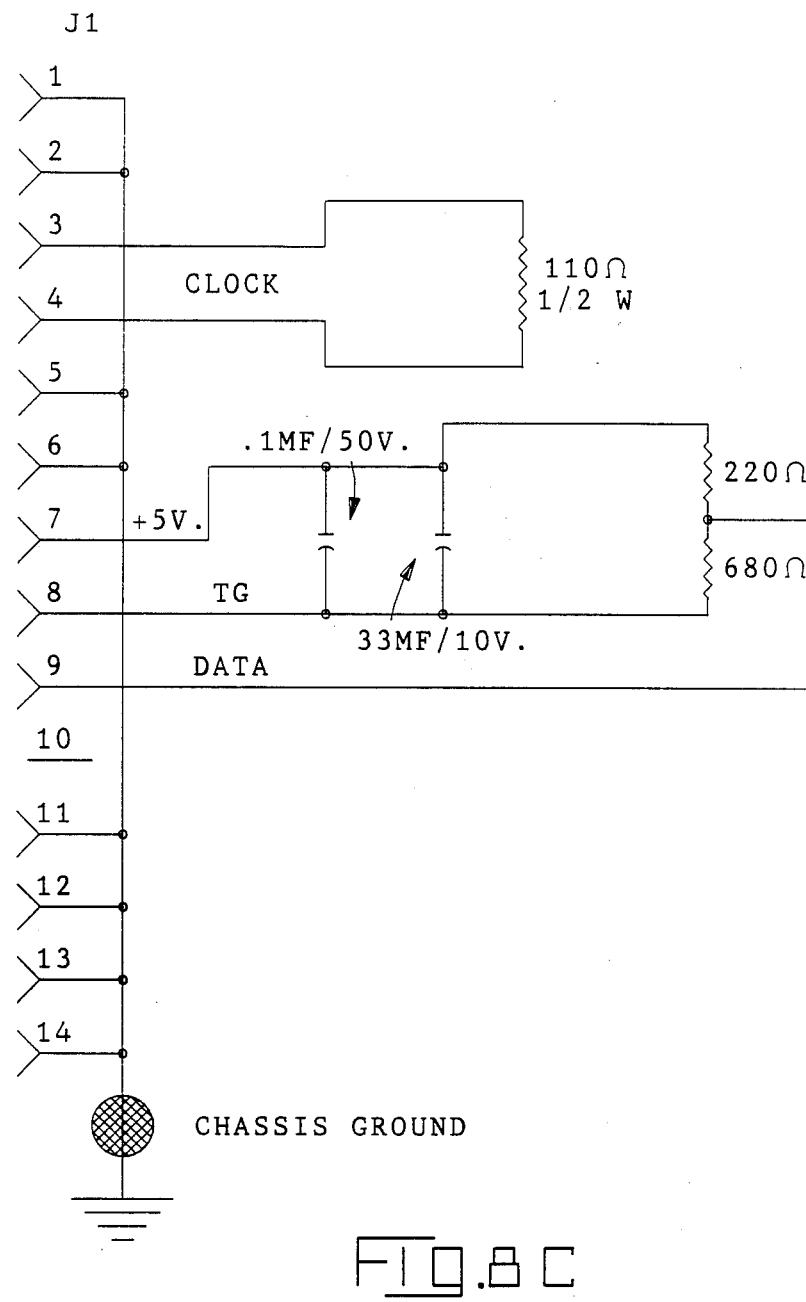

As pointed out above, the details of construction of the controller 30 and the remote stations 40 form no part of this invention, and have therefore not been described in greater detail above. The control buses CB1-CB6 can be four conductor flat cables as described in the patents and patent applications identified above. Alternately, the control buses CB1-CB6 can be implemented as respective twisted pairs operated with balanced drivers to reduce electromagnetic interference. In order to more clearly define the best mode of this invention, FIGS. 8a-8c show a schematic diagram of parts of the multiplex system of the block diagram of FIG. 1. FIG. 8a shows the controller 30, one of the buffers B1, one of the busses CB1, and related logic circuitry. FIG. 8b shows an input unit 36, in which the blocks labeled "INTERFACE CIRCUIT" correspond to the structure shown in FIGS. 2 and 3 in above referenced U.S. patent application Ser. No. 921,185. FIG. 8c shows one of the terminators T of FIG. 1. FIGS. 8a-8c have been provided merely by way of example, and are in no way intended to limit the scope of this invention.

The multiplex system described above provides a number of important advantages, including improved reliability, reduced electromagnetic interference, and reduced power bus wiring requirements. Reliability is improved because each of the six control buses CB1-CB6 is isolated from the controller 30 and from the other control buses except during the period when it is actively exchanging signals between the respective input and output units 36, 38 and the controller 30. For this reason, a short circuit or other failure in one of the control buses will not interfere with proper operation of the remaining control buses. For example, if the control bus CB1 for the front side driver's door is short circuited due to damage to the vehicle, the input and output units 36, 38 on the control bus CB1 will not operate properly. Nevertheless, the controller 30 will be able to exchange data and control signals with the input and output units 36, 38 on the remaining control buses CB2-CB6 without interruption. In this way, catastrophic, total system failures are reduced.

Electromagnetic interference is reduced because the number of control buses CB1-CB6 interconnected with the controller 30 at any given time (and therefore the total radiating control bus length) is minimized. At any given time, at least five of the six control buses are isolated from the controller 30 and are therefore not a source of electromagnetic interference.

Power bus wiring requirements are reduced because the power buses 16 can be routed to bypass the input units 36 and the switches associated with the input units. Relatively large conductors are required for the power bus 16, and this reduction in wiring requirements for the power bus 16 reduces the cost and weight of the overall system.

As yet another advantage, the wiring requirements for the vehicle are simplified since both the power buses 16 and the control buses CB1-CB6 radiate from the same fuse block 14. Though not a requirement of this invention, in many applications it will be preferable to route the power buses 16 and the control buses CB1-CB6 in the same wiring harness.

The foregoing discussion has been directed to the presently preferred embodiment of this invention, and it should be understood that a wide variety of changes and modifications can be made to this embodiment. As pointed out above, other multiplexing approaches and other types of control buses can be used. For example, in some applications optical links rather than electrical conductors may be used for the control bus in order to reduce weight, increase the band pass of the control bus, and reduce electromagnetic interference. In some embodiments multiple controllers may be mounted in the fuse block 14, or the controller 30 may be situated outside of the fuse block 14 and connected with the bus 31 by means of an appropriate additional bus (not shown). Furthermore, some multiplex systems do not require a central controller, but rather allow the input units 36 to communicate directly with the output units 38. U.S. patent application Ser. No. 921,185 (Chang), assigned to the assignee of the present invention, defines one such system. When the present invention is adapted for use with multiplex systems of this type, the controller 30 can be replaced with an oscillator to drive the clock conductor, and the bus 31 can simply interconnect the various radiating control buses CB1–CB6. It is not essential in all embodiments that the buffers B1–B6 be used, and if desired, all of the radiating control buses CB1–CB6 can be driven in parallel. Of course, if desired, both the data input and the control output terminals of each of the remote stations 40 can be used, thereby combining both input and output functions in a single remote unit.

Furthermore, the present invention can be adapted for use with a wide variety of fuse blocks, including those mounted in the engine compartment and those mounted near the instrument panel of the vehicle. Since the present invention is not restricted to use with any particular type of fuse block, the term "fuse block" is intended to refer broadly to housings or modules which include fuses from which power buses radiate.

In view of the foregoing and other alternatives and modifications to the preferred embodiment described above, it is intended that the foregoing detailed description be regarded as illustrative rather than limiting, and that it be understood that it is the following claims, including all equivalents, which define the scope of this invention.

We claim:

1. In a vehicle of the type comprising a source of electrical power; a plurality of loads; a fuse block; means for transmitting electrical current from the source of electrical power to the fuse block; a plurality of power buses radiating from the fuse block, each connectable to at least one of the loads to transmit electrical current from the fuse block to the respective loads; and fuse means, disposed in the fuse block, for providing fusible connections between the transmitting means and the power buses, the improvement comprising:

a plurality of control buses radiating from the fuse block;

means for applying a plurality of multiplexed control signals to the control buses at the fuse block;

a plurality of sets of remote stations coupled to the control buses, each of the sets coupled to a respective control bus and comprising a plurality of remote stations, at least some of said remote stations comprising means for monitoring the respective control bus and for generating demultiplexed control signals in response to selected ones of the multiplexed control signals;

means, responsive to the demultiplexed control signals, for switching electrical current from the power buses to the respective loads;

means for sequentially isolating selected sets of the control buses from the applying means.

2. The invention of claim 1 wherein the means for applying the multiplexed control signals to the control buses comprises at least one controller situated in the fuse block.

3. The invention of claim 2 wherein the controller comprises a microcomputer.

4. The invention of claim 2 wherein the means for applying the multiplexed control signals to the control buses additionally comprises means for sequentially interconnecting the controller with individual ones of the control buses such that each of the multiplexed control signals is directed to a respective selected one of the control buses.

5. The invention of claim 1 further comprising means, coupled to at least some of the remote stations, for generating a plurality of demultiplexed data signals, wherein said at least some of said remote stations comprise means for generating multiplexed data signals in response to selected ones of the demultiplexed data signals and for applying the multiplexed data signals to the respective control bus.

6. In a vehicle of the type comprising a source of electrical power; a plurality of loads; a fuse block; means for transmitting electrical current from the source of electrical power to the fuse block; a plurality of power buses radiating from the fuse block, each connectable to at least one of the loads to transmit electrical current from the fuse block to the respective loads; and fuse means, dispensed in the fuse block, for providing fusible connections between the transmitting means and the power buses, the improvement comprising:

a plurality of control buses radiating from the fuse block;

means for generating a plurality of multiplexed control signals;

means for generating a plurality of demultiplexed data signals;

junction means, situated in the fuse block, for transmitting the multiplexed control signals from the generating means to selected ones of the control buses, said junction means comprising means for sequentially selecting individual ones of the control buses as active and for isolating the generating means and the active control buses from the remaining control buses;

a plurality of sets of remote stations coupled to the control buses, each of said sets coupled to a respective control bus and comprising a plurality of remote stations, at least some of said remote stations comprising means for monitoring the respective control bus and for generating demultiplexed control signals in response to selected ones of the mulitplexed control signals, at least some of the remote stations comprising means for generating multiplexed data signals in response to selected ones of the demultiplexed data signals and for applying the multiplexed data signals to the respective control bus; and means, responsive to the demultiplexed control signals, for switching electrical current from the power buses to the respective loads.

7. The invention of claim 6 wherein the multiplexed control signal generating means comprises a controller situated in the fuse block.

8. The invention of claim 7 wherein the controller comprises a microcomputer.

* * * * *